(12) United States Patent
Eriksson

(10) Patent No.: US 6,299,395 B1
(45) Date of Patent: Oct. 9, 2001

(54) VEHICLE LOADING ARRANGEMENT

(75) Inventor: Hans Eriksson, Ljusdal (SE)

(73) Assignee: Exte Fabriks AB (SE)

( * ) Notice: Subject to any disclaimer, the term of this patent is extended or adjusted under 35 U.S.C. 154(b) by 0 days.

(21) Appl. No.: 09/380,565

(22) PCT Filed: Mar. 2, 1998

(86) PCT No.: PCT/SE98/00371

§ 371 Date: Sep. 3, 1999

§ 102(e) Date: Sep. 3, 1999

(87) PCT Pub. No.: WO98/39174

PCT Pub. Date: Sep. 11, 1998

(30) Foreign Application Priority Data

Mar. 3, 1997 (SE) .................................... 9700756

(51) Int. Cl.⁷ ....................................................... B60P 7/12
(52) U.S. Cl. ................................ 410/37; 410/32; 410/34; 410/36; 280/146
(58) Field of Search .................................. 410/32, 34, 35, 410/36, 37, 42; 280/143, 146, 404; 296/26.04, 26.05, 43; 105/380, 389

(56) References Cited

U.S. PATENT DOCUMENTS

| | | | | |
|---|---|---|---|---|
| 870,123 | * | 11/1907 | Perry . | |
| 1,342,654 | * | 6/1920 | Torgerson | 410/37 |
| 2,565,748 | * | 8/1951 | Van Vleet | 410/37 X |
| 3,504,404 | * | 4/1970 | Rehnstrom et al. | 410/34 X |
| 5,964,557 | * | 10/1999 | Eng | 410/37 |
| 5,993,126 | * | 11/1999 | Janzen | 410/37 |
| 6,149,360 | * | 11/2000 | Billotte | 410/37 |

FOREIGN PATENT DOCUMENTS

| | | |
|---|---|---|
| 65584 | 2/1984 | (FI) . |
| 415161 | 5/1980 | (SE) . |
| 415745 | 10/1980 | (SE) . |
| 420699 | 10/1981 | (SE) . |
| 426677 | 2/1983 | (SE) . |

* cited by examiner

Primary Examiner—Stephen T. Gordon
(74) Attorney, Agent, or Firm—Banner & Witcoff, Ltd.

(57) ABSTRACT

A mounting arrangement for mounting a loading bunk (3) to a frame beam (2) of a vehicle, wherein the loading bunk includes a horizontal beam (4) and wherein the mounting plate (13) can be moved longitudinally on the frame beam (2) and locked thereto. The mounting plate (13) includes locking means (18) for securing the beam (4) in the transverse direction. The locking means (18) includes shape-conforming latching means (19) for coacting engagement with engagement devices (12) disposed on the beam (4).

10 Claims, 3 Drawing Sheets

VEHICLE LOADING ARRANGEMENT

FIELD OF INVENTION

The present invention relates to an arrangement for mounting a loading bunk to a vehicle, said bunk being of the kind that includes a horizontal loading beam and generally vertical posts attached at respective ends of said loading beam.

BACKGROUND OF THE INVENTION

Arrangements of this kind are known to the art. For instance, SE 420 699 and SE 426 677 teach a loading bunk that includes a horizontal beam attached to the upper part of a vehicle chassis so as to extend in the transverse direction of the vehicle, and two posts which project vertically upwards from respective ends of the beam. Such loading bunks are secured with their horizontal beams extending transversely to and on the vehicle frame beams. The horizontal beams have been secured either by welding the bunk directly to the frame beams or by welding a displaceable and lockable intermediate device on the loading bunk/frame beam, so as to enable the loading bunk to be replaced and also to enable the bunk to be adjusted positionally either in the longitudinal direction of the vehicle or in its transverse direction.

It is also known to mount a loading bunk on a lockable mounting plate that can be displaced in the longitudinal direction of the vehicle with the aid of screw joints that require the presence of one or more holes in the bunk bodywork.

These earlier known mounting arrangements do not allow the position of the bunk to be adjusted in both its longitudinal and its transversal directions, since such adjustment is obstructed either by a weld or by a screw joint that requires the provision of holes in the bunk body work. Neither has it been possible to use one and the same bunk for several different types of vehicles having mutually varying widths between the frame beams.

OBJECT OF THE INVENTION

The object of the invention is to solve the aforesaid problems and to provide a mounting arrangement of the aforedescribed kind that will allow a loading bunk to be mounted on the vehicle frame beams and also to move the loading bunk to another vehicle where the distance between the frame beams is different than in the case of the former vehicle.

Another object of the present invention is to provide a loading bunk that when mounted on said frame beams can be adjusted in both the longitudinal direction and the transverse direction of the vehicle.

SUMMARY OF THE INVENTION

The object of the invention is achieved with the aid of a mounting arrangement which includes shape-conforming means for locking a loading bunk in the transverse direction, and also means for locking the bunk in the longitudinal direction.

In accordance with the following claims, the invention provides a loading bunk mounting arrangement which enables the bunk to be fitted/removed quickly by virtue of requiring no welds when mounting the bunk. Neither is it necessary to provide holes in the bunk body work. The bunk can be adapted quickly and flexibly to different frame widths, and the horizontal beam of the loading bunk will remain fully intact in the event of adjusting the bunk to another frame width.

BRIEF DESCRIPTION OF THE DRAWINGS

The invention will now be described in more detail with reference to the accompanying drawings provided with reference signs.

DESCRIPTION OF THE INVENTION

Figure 1:
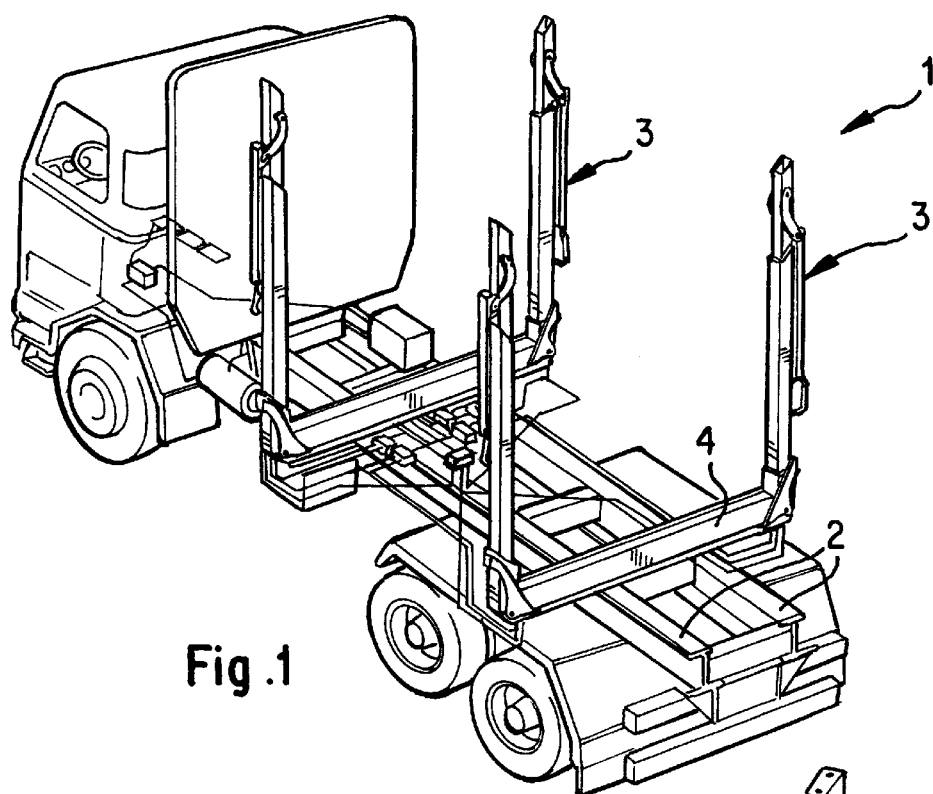
FIG. 1 shows a vehicle equipped with two loading bunks that have been mounted on a vehicle by means of an inventive mounting arrangement.
Figure 2:
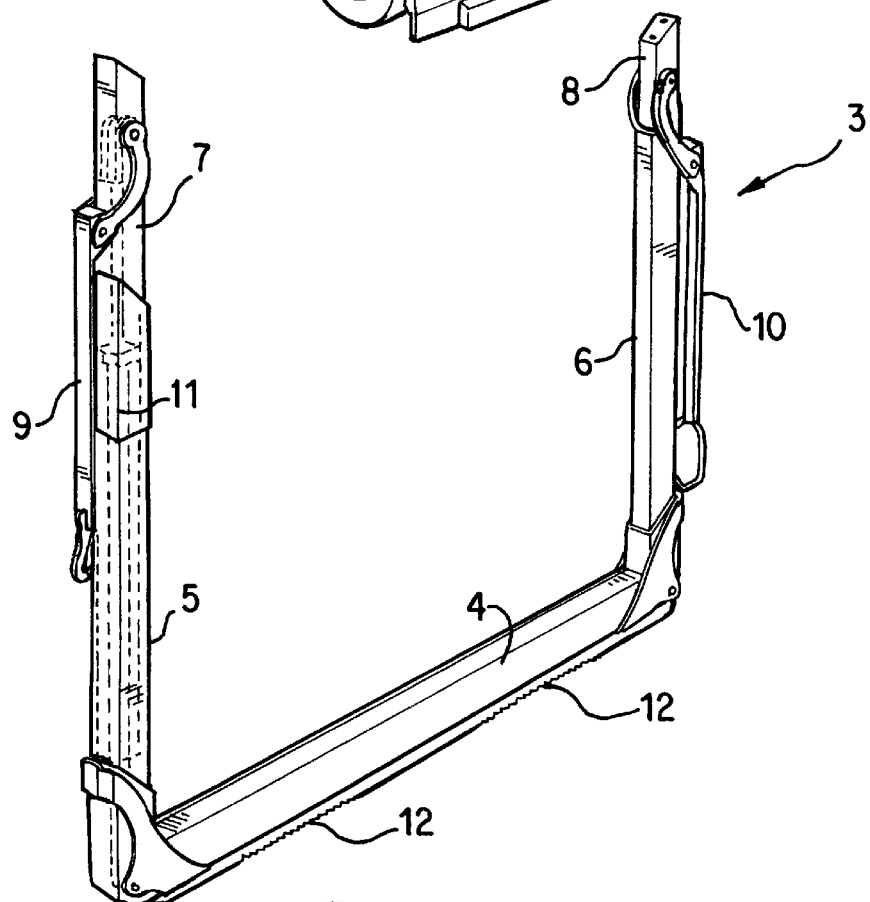
FIG. 2 illustrates a loose-loading bunk that can be secured with the aid of inventive mounting arrangements.

FIG. 1 shows a vehicle 1 which is adapted, e.g., for timber transportation and which includes one or more frame beams 2 extending in the longitudinal direction of the vehicle. Extending across the frame beams 2 is at least one loading bunk 3, see also FIG. 2, which includes a horizontal beam 4 and two post assemblies, each of which comprises a respective bottom post 5 and 6 and a respective top post 7 and 8, said top posts being telescopically movable in the bottom posts. The top posts 7, 8 are provided with an overhead restraining arrangement which comprises hook means 9 pivotally mounted on one top post 7 and a ring means 10 which is pivotally mounted on the other top post 8. Provided in the posts is a respective piston-cylinder device 11 for displacing the top posts telescopically and also for hooking together the hook means 9 and the ring means 10, either centrally between the top posts or adjacent one of said top posts.

The horizontal beam 4 is also provided with fixedly mounted engagement devices 12 whose form enables the loading bunks to be locked against displacement in the transverse direction. In the embodiment shown in FIG. 2, the engagement devices 12 have a length which enables the bunk to be mounted on different vehicles with different distances between the frame beams. The engagement devices are also disposed along a first distance on one side and along another distance on the other side. Engagement devices are provided on both sides, i.e. both the forwardly facing side of the horizontal beam and its rearwardly facing side.

In another embodiment, the engagement devices are disposed along the full length of the horizontal beam on both sides thereof.

The engagement devices and the clamping devices coact to enable relative movement in a vertical direction while preventing relative movement in a horizontal direction. As will be seen from FIGS. 2 and 3, these mutually coacting parts have a corrugated or an undulating shape, although they may alternatively be comb-shaped or tooth-shaped.

Figure 3:
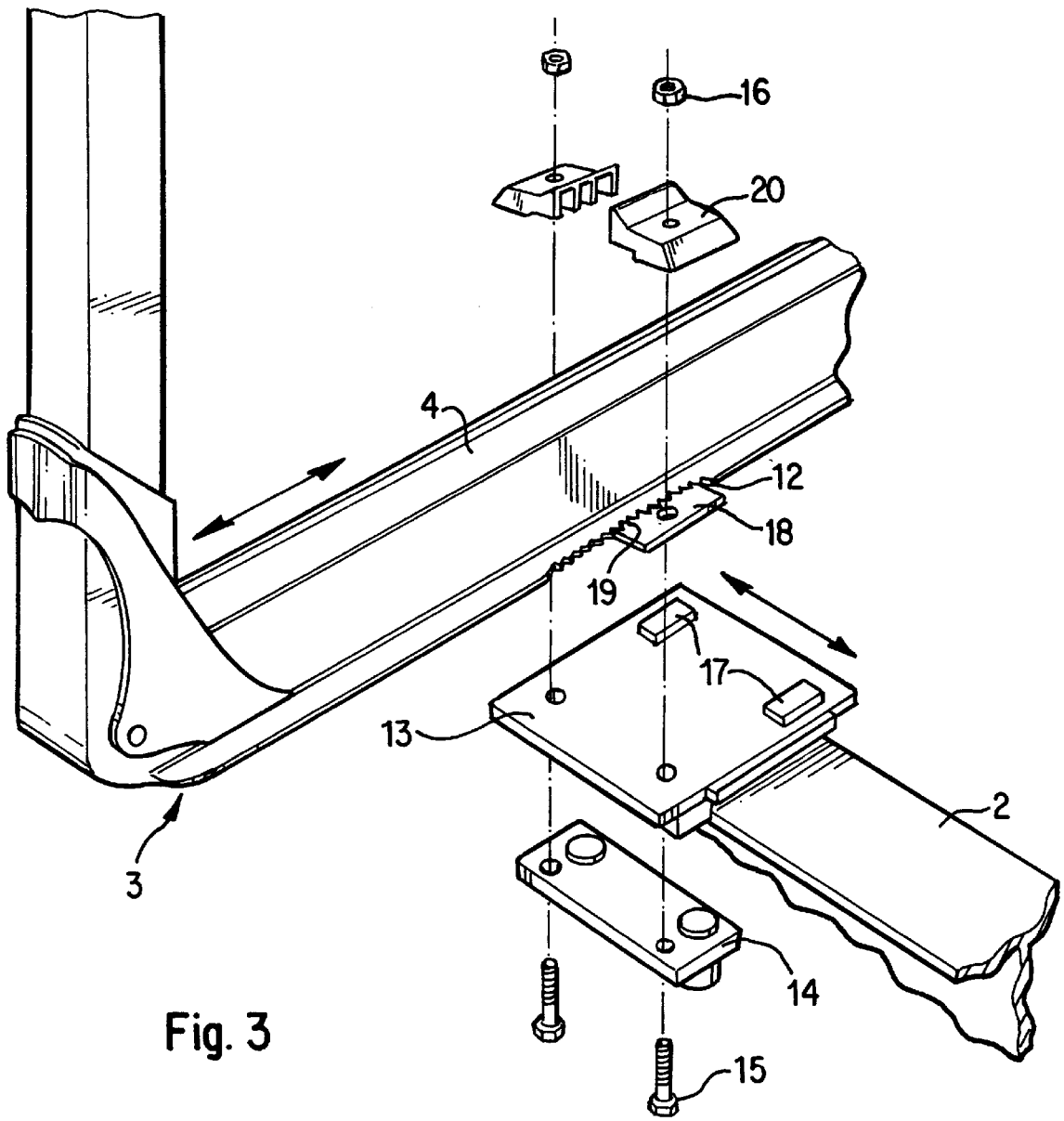
FIG. 3 is an exploded view of one embodiment of an inventive mounting arrangement.

FIG. 3 shows a mounting plate 13 that can slide on the frame beam 2 in the longitudinal direction, as indicated by the double-headed arrow. The mounting plate 13 is locked firmly in the longitudinal direction with an underlying plate 14 which is pressed firmly around the flange of the frame beam 2 by means of a screw joint that includes a screw 15 and a nut 16. The mounting plate 13 also includes two guide shoulders 17 between which the horizontal beam 4 of the loading bunk 3 can be displaced in the transverse direction, see the other double-headed arrow. The mounting plate 13 has a locking device 18 detachably fixed thereto. The locking device 18 is provided with shape-conforming latching means 19 for engagement with the engagement devices 12. In the illustrated embodiment, the locking means 18 has the form of a toothed plate screwed firmly to the mounting plate by means of the screw 15. As indicated in the Figure, both sides of the loading bunk are provided with locking means 18. The mounting plate is also provided with a vertical locking means 20 which presses the horizontal beam of the bunk firmly against the mounting plate and therewith also against the frame beam 2, in coaction with the screw 15.

Figure 4A:
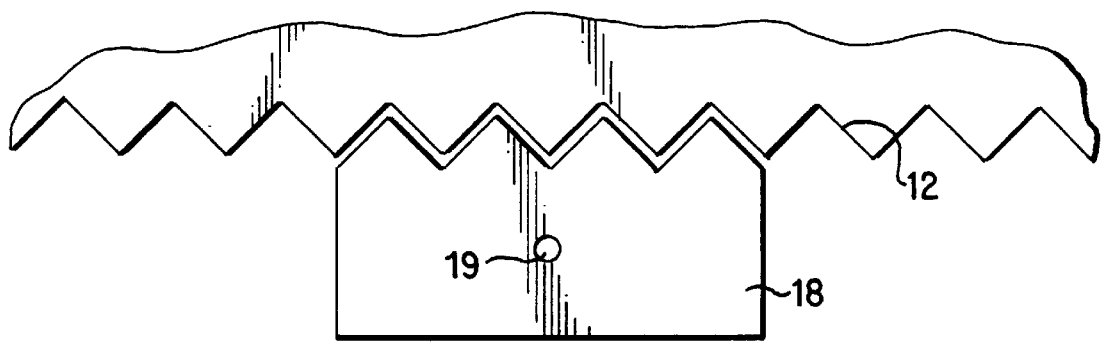
FIG. 4A illustrates a locking means with symmetrically configured latching means.
Figure 4B:
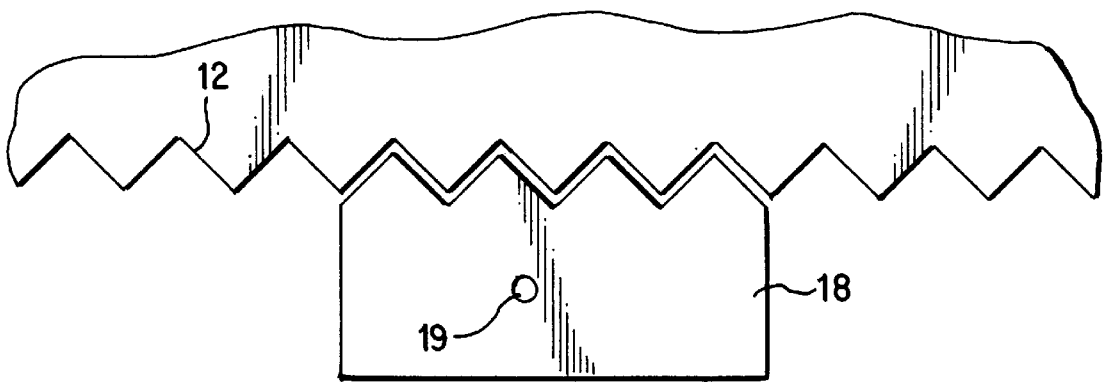
FIG. 4B illustrates a locking means with asymmetrically configured latching means.

In an alternative embodiment of the invention shown in FIG. 4B, the shape-conforming latching means 19 of the locking means 18 are configured asymmetrically with respect to securing the locking means to the mounting plate, so as to enhance adjustability when turning the locking means. In this case, the shape-conforming latching means 19 are displaced through one-half pitch in relation to pure symmetry, irrespective of whether said means have an undulating shape, a comb shape or a tooth shape. This increases the adjustment accuracy two-fold in relation to pure symmetry.

The loading bunk 3 is mounted on the frame beam of a vehicle by first laying the mounting plate 13 on said beam and then laying the loading bunk 3 on the mounting plate in the correct transverse position, whereafter a locking means 18 on each side of the bunk is brought into engagement with the engagement devices 12 on the beam 4 and the vertical locking means 12 then fitted over each locking means 18. The underplate 14 is then secured to the mounting plate, by passing the screw 15 through the underplate 14, the mounting plate 13, the locking means 18 and the vertical locking means 20 from beneath, and tightening the nut 16 on the upper side of the vertical locking means 20. As will be apparent from the drawings, the screw joints act in pairs on both sides of the loading bunk.

What is claimed is:

1. A loading bunk and mounting arrangement for mounting said loading bunk on a frame beam of a vehicle, said loading bunk comprising a beam for extending transverse to a length of the frame beam of the vehicle, said loading bunk beam including a longitudinal edge having engagement devices extending along at least a portion of its length; and said mounting arrangement comprising a mounting plate moveable along a length of the frame beam of the vehicle in a direction transverse to a length of said loading bunk beam, said mounting plate being securable to the frame beam and including a locking device having a plurality of shape conforming latching members that engage the engagement devices of the loading bunk beam to prevent said loading bunk beam from moving transverse to the length of the frame beam.

2. The loading bunk and mounting arrangement according to claim 1, wherein the engagement devices on said loading bunk beam and the shape-conforming latching members on the locking device are disposed rectilinearly along the loading bunk beam and the locking device respectively with a length of the engagement devices of said loading beam exceeding a length of the shape-conforming latching members on the locking device.

3. The loading bunk and mounting arrangement according to claim 2, wherein the mounting arrangement includes a screw joint for locking the mounting plate firmly to the frame beam and for holding the locking device of the mounting plate in engagement with the engagement devices on the loading bunk beam.

4. The loading bunk and mounting arrangement according to claim 3, further comprising a vertical locking system fitted to the mounting plate and functioning to press the loading bunk beam against the mounting plate.

5. The loading bunk and mounting arrangement according to claim 4, wherein the screw joint also functions to secure the vertical locking system to the mounting plate.

6. The loading bunk and mounting arrangement according to claim 1, wherein the shape-conforming latching members of the locking device are asymmetrically configured so as to increase adjustability of the locking device when the locking device is turned over from a first position to a second position.

7. The loading bunk and mounting arrangement according to claim 2, wherein the shape-conforming latching members of the locking device are asymmetrically configured so as to increase adjustability of the locking device when the locking device is turned over from a first position to a second position.

8. The loading bunk and mounting arrangement according to claim 3, wherein the shape-conforming latching members of the locking device are asymmetrically configured so as to increase adjustability of the locking device when the locking device is turned over from a first position to a second position.

9. The loading bunk and mounting arrangement according to claim 4, wherein the shape-conforming latching members of the locking device are asymmetrically configured so as to increase adjustability of the locking device when the locking device is turned over from a first position to a second position.

10. The loading bunk and mounting arrangement according to claim 5, wherein the shape-conforming latching members of the locking device are asymmetrically configured so as to increase adjustability of the locking device when the locking device is turned over from a first position to a second position.

* * * * *